United States Patent
Takahashi

(10) Patent No.: US 7,813,480 B2
(45) Date of Patent: Oct. 12, 2010

(54) PHONE TERMINAL AND RECORD/PLAY PROGRAM

(75) Inventor: Hideaki Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1326 days.

(21) Appl. No.: 10/793,775

(22) Filed: Mar. 8, 2004

(65) Prior Publication Data

US 2004/0179656 A1 Sep. 16, 2004

(30) Foreign Application Priority Data

Mar. 11, 2003 (JP) .............................. 2003-065567

(51) Int. Cl.
- H04M 1/64 (2006.01)
- H04M 1/24 (2006.01)
- H04M 3/08 (2006.01)
- H04M 3/22 (2006.01)

(52) U.S. Cl. ..................... 379/68; 379/1.02; 379/32.01; 379/88.12

(58) Field of Classification Search ................ 379/67.1, 379/68, 32.01
See application file for complete search history.

(56) References Cited

U.S. PATENT DOCUMENTS

| | | | |
|---|---|---|---|
| 4,195,220 A * | 3/1980 | Bristol et al. ................... | 377/13 |
| 4,247,876 A * | 1/1981 | Bolick, Jr. ................... | 360/92.1 |
| 5,442,685 A * | 8/1995 | Sakata et al. ................ | 379/67.1 |
| 5,533,103 A * | 7/1996 | Peavey et al. ................... | 379/69 |
| 5,749,052 A * | 5/1998 | Hidem et al. ................ | 455/406 |
| 6,654,447 B1 * | 11/2003 | Dewan ......................... | 379/76 |
| 6,661,879 B1 * | 12/2003 | Schwartz et al. .......... | 379/88.25 |
| 7,054,420 B2 * | 5/2006 | Barker et al. ............. | 379/88.25 |
| 7,471,773 B2 * | 12/2008 | Takahashi ..................... | 379/72 |
| 7,477,575 B2 * | 1/2009 | Gallant ....................... | 368/108 |
| 2002/0120925 A1 * | 8/2002 | Logan ............................ | 725/9 |
| 2003/0093790 A1 * | 5/2003 | Logan et al. ................... | 725/38 |
| 2004/0033815 A1 * | 2/2004 | Noldus et al. ............... | 455/560 |
| 2004/0063472 A1 * | 4/2004 | Shimizu et al. .......... | 455/569.1 |
| 2004/0179656 A1 * | 9/2004 | Takahashi .................. | 379/67.1 |

FOREIGN PATENT DOCUMENTS

| | | |
|---|---|---|
| JP | A 59-70326 | 4/1984 |
| JP | A 60-189359 | 9/1985 |
| JP | A 02-179150 | 7/1990 |

(Continued)

OTHER PUBLICATIONS

Foreign Office Action dispatched Dec. 29, 2006 to Chinese Application No. 200410039941.2 (with translation).

(Continued)

Primary Examiner—Joseph T Phan
(74) Attorney, Agent, or Firm—Oliff & Berridge, PLC

(57) ABSTRACT

A phone terminal is provided which allows more efficient use of a record area for recording call data than before. A complex apparatus is capable of suspending recording of call data during a period in which a no-service state is detected. As a result, the recordation of call data is not performed while the call is interrupted. The call data no longer contains a voiceless area. The size of the call data can be minimized, resulting in that the effective use of the record area is promoted.

10 Claims, 8 Drawing Sheets

FOREIGN PATENT DOCUMENTS

| | | |
|---|---|---|
| JP | A-03-265319 | 11/1991 |
| JP | A-04-063047 | 2/1992 |
| JP | A-07-320400 | 12/1995 |
| JP | A 09-284202 | 10/1997 |
| JP | A 10-326100 | 12/1998 |
| JP | A 2000-106593 | 4/2000 |
| JP | A 2002-218540 | 8/2002 |

OTHER PUBLICATIONS

Foreign Office Action dispatched Jul. 13, 2007 to Chinese Application No. 200410039941.2 (with translation).

* cited by examiner

PHONE TERMINAL AND RECORD/PLAY PROGRAM

BACKGROUND OF THE INVENTION i) Technical Field of the Invention

This invention relates to a phone terminal with a call recorder, and a record/play program for use with such a phone terminal.

ii) Description of the Related Art

Conventionally, phone terminals such as a fixed phone and a portable phone provided with a phone call recorder have been known. In such phone terminals, voice recording during a call can be started and ended in response to a prescribed operation made by a user on the line.

For example, the Unexamined Japanese Patent Publication No. 59-70826 discloses a cordless phone having a phone call recorder provided in a master set thereof, which can be controlled to start and end recording of a call (switch on and off the call recorder) by a control signal not only received from the master set but also from a slave set of the cordless telephone.

However, in the phone terminal of the above prior art, even if a call using the slave set of the cordless phone is interrupted due to poor reception or battery shutoff on the side of the slave set, for example, voice recording on the phone call recorder in the master set is continued unless otherwise suspended intentionally.

As a result, recorded data of the phone call includes a useless area which corresponds to a period during which the phone call is interrupted and no voice is recorded, causing the data size (data amount) of the call to expand in vain. This is not desirable in order to promote efficient use of the area for recording call data.

SUMMARY OF THE INVENTION

One object of the present invention which was made to solve the above problem is to provide a phone terminal that allows more effective utilization of an area for recording call data than before. Another object of the present invention is to provide a record/play program to be used in such a phone terminal.

In order to attain the above objects, one aspect of the present invention provides a phone terminal comprising a record unit, a voice output unit, a record instruction unit, a play instruction unit, and a record interruption unit. The record unit records various data. The voice output unit outputs various voices. The record instruction unit makes the record unit record voices in a call as call data from when predetermined start conditions are met until predetermined end conditions are met. The play instruction unit makes the voice output unit output the call data recorded by the record unit as voices. The record interruption unit suspends recording of call data by the record unit while obstructive conditions for hindering the call are satisfied.

According to the above phone terminal, the recording of call data by the record unit is not performed during interruption of the call. Thus, the call data does not include a waste data area in which no voice is recorded. Since the data size (data amount) of the call data does not expand uselessly, efficient use of the area for recording call data is facilitated.

The aforementioned record instruction unit instructs the record unit to record call data. The record instruction unit instructs recordation of call data from when the predetermined start conditions are fulfilled until the predetermined end conditions are fulfilled. Here, the "predetermined start conditions" mean, for example, execution of a user operation for starting recordation of a call. The "predetermined end conditions" mean execution of a user operation for ending recordation of a call or for ending a call.

The record interruption unit suspends and resumes recording of call data by the record unit. The record interruption unit suspends recording all the while the obstructive conditions for hindering a call are satisfied. The "obstructive conditions" are satisfied, for example, when a slave set of a phone terminal, which is capable of transmitting and receiving voices via radio communication, becomes unable to communicate with a master set of the phone terminal.

Particularly, it is preferable that the phone terminal comprises a slave terminal that can transmit and receive various data including voices via radio communication to and from the phone terminal, and a no-service detection unit that detects the slave terminal is in a no-service area where radio communication with the master phone terminal cannot be maintained. While a no-service state is detected by the no-service detection unit, the record interruption unit determines that the obstructive conditions are met and thus suspends recording of call data by the record unit.

The phone terminal constituted as above can interrupt recordation of call data by the record unit during a period in which the master phone terminal is unable to reach the slave terminal via radio communication.

The no-service detection unit in the above constitution detects non-availability of radio communication between the master phone terminal and the slave terminal. For example, the no-service detection unit can be configured so as to determine that the radio communication between the master phone terminal and the slave terminal is not available when a reception level of radiowaves transmitted from the slave terminal is lower than a predetermined threshold.

There is a time lag from when the aforementioned obstructive conditions are satisfied until the recording of call data, executed based on the instructions from the record interruption unit, is actually interrupted. As a result, a voiceless area may be generated in the call data just before the recordation is interrupted.

Accordingly, it is preferable that the phone terminal comprises an area deletion unit that removes the data area created between from the fulfillment of the obstructive conditions to the interruption, of recording of call data, according to the instructions from the record interruption unit.

Such a phone terminal dispenses with the area assumed to have no voice, and allows even more efficient use of the area for recording call data.

The call data recorded by the record unit is outputted as voices by the voice output unit according to the instructions from the play instruction unit. If the voice output unit outputs the call data as voices recorded as instructed by the record instruction unit, the voices recorded after the recovery of recordation are outputted immediately after the voices that had been recorded until the interruption of recordation. The voices outputted in this manner sounds unnatural since a blank period without recordation is merely cut out from the call data. It is difficult for the user to recognize the interruption of recordation.

Therefore, it is preferable that the phone terminal of the present invention comprises a fade-out control unit that adjusts the volume in such a manner that voices in the call data recorded by the record unit fade out, from a predetermined time prior to the interruption of recording according to the instructions from the record interruption unit, till the point of interruption of recording.

According to the phone terminal constituted as such, the volume of voices is gradually lowered toward the point of interruption of recording. Therefore, the user can easily recognize that there is an interruption in the recordation.

It is further preferable that the phone terminal comprises a fade-in control unit that adjusts the volume in such a manner that voices in the call data recorded by the record unit fade in, from the point of recovery of recording till a predetermined time posterior to the recovery of recording.

According to the phone terminal constituted as above, the volume of voices is gradually raised from the point of recovery of recording. Therefore, the user can easily recognize that there is an interruption in the recordation.

Specifically, since the present phone terminal comprises the fade-in control unit as well as the fade-out control unit, the volume of voices is turned down by and by toward the point of interruption of recording, and then turned up steadily from the point of recovery of recording. This allows the user to perceive that there is a discontinuity in the recordation in a natural way.

In the present phone terminal, the play instruction unit makes the voice output device output as voices the data recorded before the recordation is suspended according to the instructions from the record interruption unit, of the call data recorded by the record unit. The play instruction unit then makes the voice output unit output notification that notifies the user that the obstructive conditions have been satisfied, and output as voices the data recorded after the recordation is resumed.

The play instruction unit in this preference is designed to make the voice output unit output a voice signal having a specific frequency level for a certain period as the notification, for example.

The above "voice signal having a specific frequency level", for example, is a sound having a frequency predetermined to inform the user that the obstructive conditions have been met, or a hold sound for use in putting a call on hold, etc. The "certain period" for outputting the notification, for example, is a period during which the notification is repeated for a predetermined number of times.

The above play instruction unit may be configured to generate a message for notifying the user how long the recordation has been interrupted as the notification.

Particularly, it is preferable that the phone terminal comprises a first interruption timing unit that times the interruption of recording of call data. The record instruction unit makes the record unit record interruption data indicating how long the recording has been interrupted, obtained from the first interruption timing unit, in association with the call data. The play instruction unit generates a message stating how long the obstructive conditions have been satisfied based on the interruption data associated with the call data, and makes the voice output unit output the message as notification.

According to the above phone terminal, the user can be notified of not only that the recording was interrupted owing to the fulfillment of the obstructive conditions but also how long the recording has been interrupted.

In the present phone terminal, the play instruction unit outputs as voices the data recorded before the recordation is suspended according to the instructions from the record interruption unit, of the call data. The play instruction unit remains still for a predetermined period and then makes the voice output unit output as voices the data recorded after the recordation was resumed.

In the constitution above, the "predetermined period", during which the play instruction unit stands by, can be the period during which the voice recording is actually suspended.

Particularly, it is preferable that the phone terminal comprises a second interruption timing unit that times the interruption of recording of call data. The record instruction unit makes the record unit to record interruption data indicating how long the recording has been interrupted, obtained from the second interruption timing unit, in association with the call data. The play instruction unit makes the voice output unit output as voices the data recorded before the interruption of recording, of the call data, stands by for a period indicated in the interruption data associated with the call data, and then makes the voice output unit output the message after the recovery of recording.

According to the above phone terminal, reduction in the data size of call data can be achieved, while the call data appears to be outputted in the same manner as before, that is, as if the recording is not discontinued at all.

It is further preferable that the phone terminal comprises a third interruption timing unit that times the interruption of recording of call data. The record instruction unit makes the record unit record interruption data indicating how long the recording had been interrupted, obtained from the third interruption timing unit, in association with the call data. The play instruction unit does not make the voice output unit output notification when the interruption indicated in the interruption data associated with the call data is within a predetermined time.

As previously mentioned, if the call data is outputted as recorded by the record instruction unit, it is hard for the user to recognize that there is a discontinuity in voice recording. There is a fear that the user simply takes the recording as unnatural. However, if the interruption of voice recording is as short as can be ignored, the user may not assume the recording unnatural even without the notification. Accordingly, by setting the aforementioned "predetermined time" as short as that the user finds it negligible, it is possible not to make the voice output means output the notification.

The third interruption timing unit in this preference can be the same unit as the first or second interruption timing unit, or another independent unit.

Another aspect of the present invention provides a record/play program that makes a computer system function as the aforementioned record instructions unit, play instruction unit, and record interruption unit. The record/play program may be designed as well to function as one of the aforementioned no-service detection unit, area deletion unit, fade-out control unit, fade-in control unit, interruption timing unit (first, second, third interruption timing units) or a combination of the foregoing. The computer system that is capable of running such a record/play program can be part of the phone terminal of the present invention.

The record/play program is made up of a series of commands to be processed in a computer system. This program may be supplied to a phone terminal, a computer system or a user who uses the aforementioned, via a recording medium such as a FD, a CD-ROM, or a memory card. The program may also be supplied over a transmission line such as the Internet, for example. The program is executed in a computer system provided in a phone terminal, or in a computer system capable of communicating with a phone terminal by wire or by radio.

BRIEF DESCRIPTION OF THE DRAWING

The invention will now be described, by way of example, with reference to the accompanying drawings, in which:

FIG. 6 is a flowchart illustrating a call process according to a second embodiment;

DETAILED DESCRIPTION OF PREFERRED EMBODIMENT

First Embodiment

Figure 1:
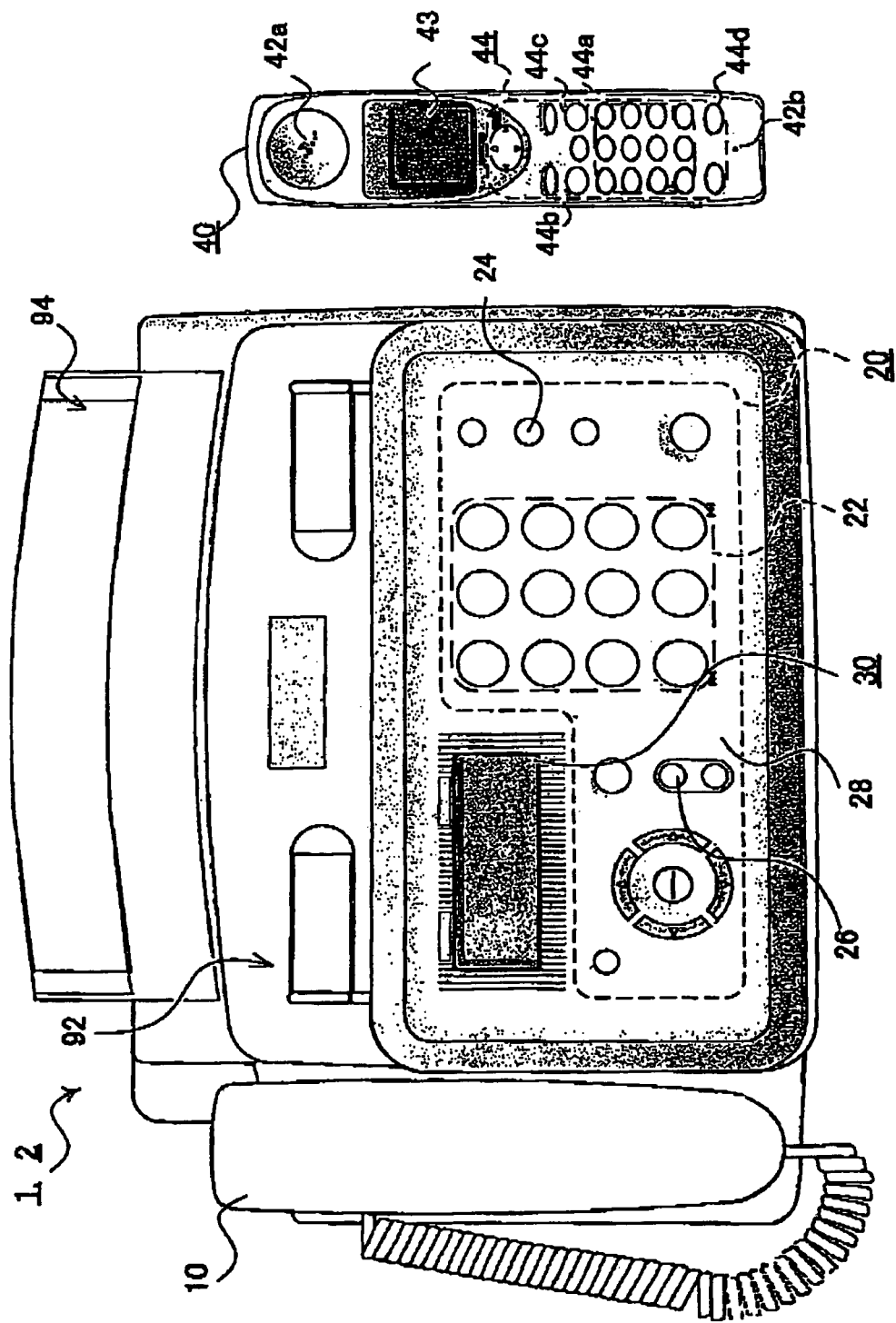
FIG. 1 shows an external view of a complex apparatus in an embodiment of the present invention.

A complex apparatus 1 is an apparatus which serves as a phone terminal, a facsimile machine, a copy machine, and a scanner. As shown in FIG. 1, the complex apparatus 1 comprises a handset 10 provided on one side of a main body, an operation panel 20 and a display panel 30 both arranged on the upper face of the main body, a slave terminal 40 to be used in radio communication, etc.

Figure 2:
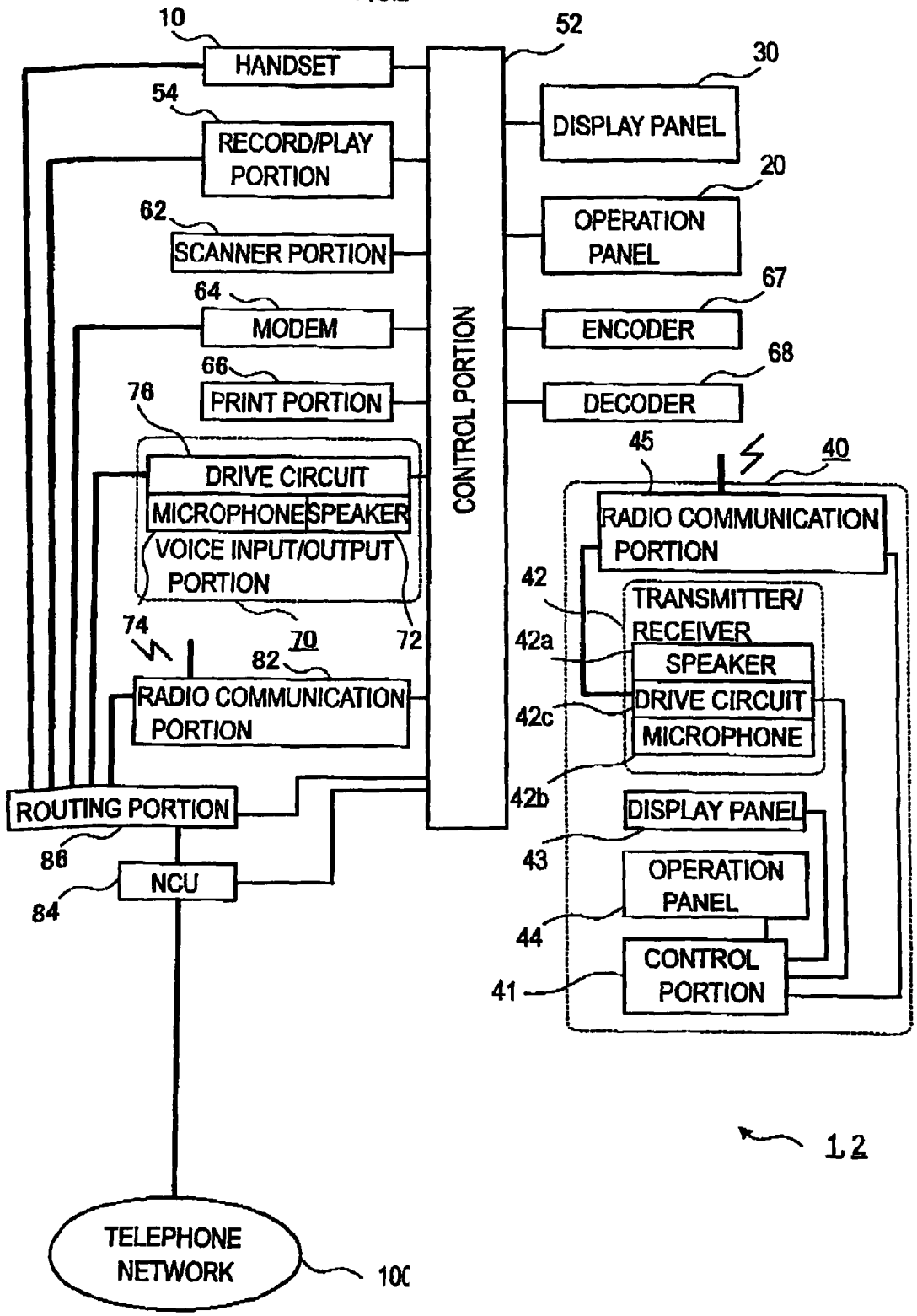
FIG. 2 is a block diagram showing a control system of the complex apparatus.

As shown in FIG. 2, the main body of the complex apparatus 1 includes a control portion 52, a record/play portion 54, a scanner portion 62, a modem 64, a print portion 66, an encoder 67, a decoder 68, a voice input/output portion 70, a radio communication portion 82, a NCU (network control unit) 84, a routing portion 86, etc.

The handset 10 is a transmitter/receiver. When a user makes or receives a call, the handset 10 is picked up from the main body of the complex apparatus 1.

The operation panel 20 comprises a plurality of input keys 22 for inputting letters, numerals and symbols, a speaker phone button 24 provided for a hands-free call via the voice input/output portion 70, a play/record button 26 used in a later-explained call process (FIG. 3), etc.

Figure 3:
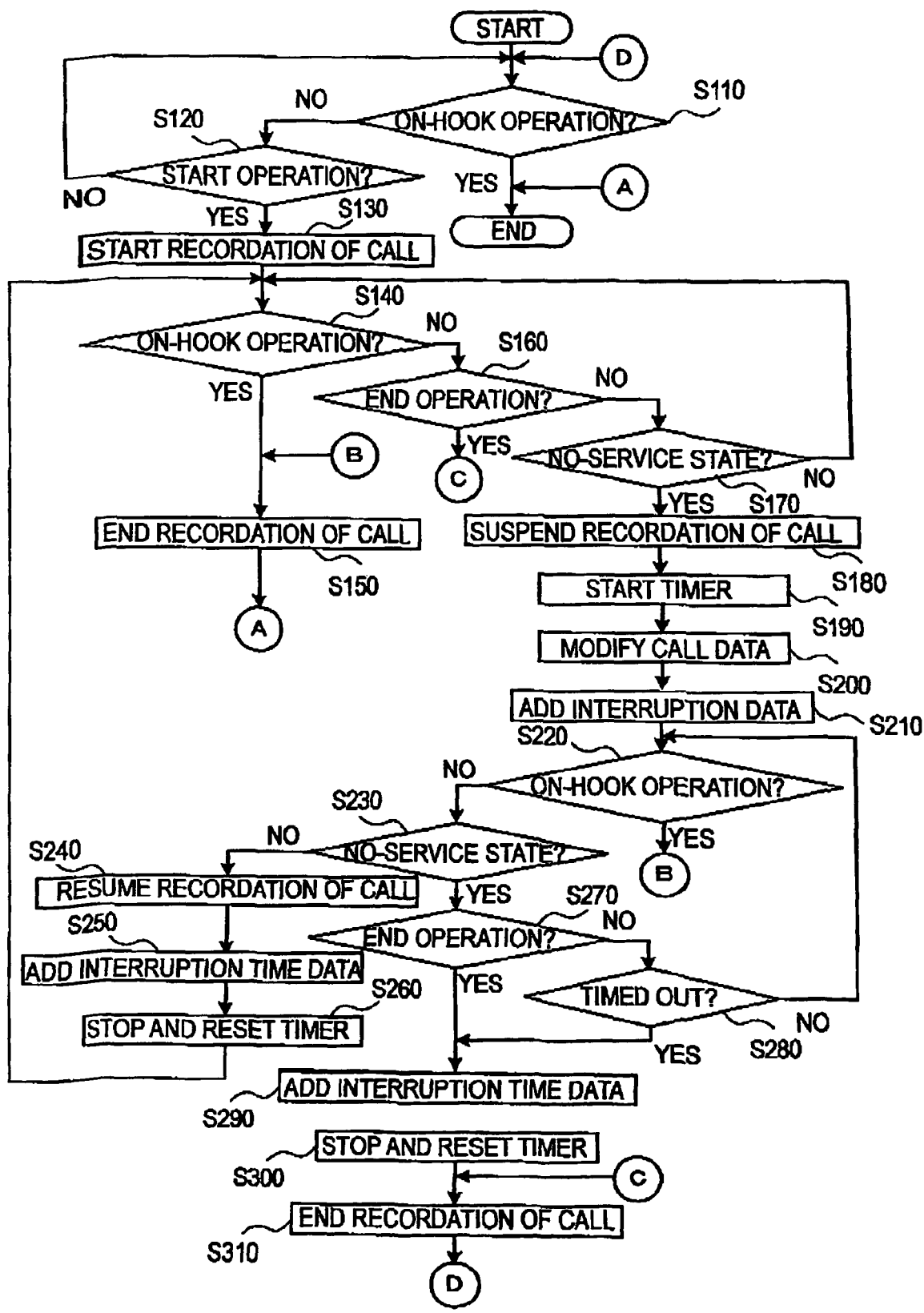
FIG. 3 is a flowchart illustrating a call process according to a first embodiment.

The slave terminal 40 comprises a control portion 41, a transmission/reception portion 42, a display panel 43, an operation panel 44, a radio communication portion 45, etc. The control portion 41 controls the overall operation of the slave terminal 40 by sending instructions, based on a program recorded in a memory of the control portion 41, to the respective components of the slave terminal 40. The transmission/reception portion 42 comprises a speaker 42a, a microphone 42b, and a drive circuit 42c that activates the speaker 42a and microphone 42b. The operation panel 44 comprises a plurality of input keys 44a for inputting letters, numerals and symbols, an extension button 44b for starting a call by radio, an off button 44c for ending a call by radio, and a record button 44d used in the later-explained call process (FIG. 3). The radio communication portion 45 transmits and receives various signals including a voice signal to and from the radio communication portion 82 in the main body of the complex apparatus 1 to establish a call by radio. When the user operates the operation panel 44 of the slave terminal 40, a control signal representing the operation is transmitted to the radio communication portion 82 in the main body of the complex apparatus 1. Based on the control signal, the control portion 52 in the main body specifies the operation performed on the operation panel 44 of the slave terminal 40.

The control portion 52 transmits instructions, based on the program recorded in a memory thereof, to the respective components of the complex apparatus 1. The control portion 52 controls the overall operation of the complex apparatus 1.

The record/play portion 54 records a voice signal inputted through the routing portion 86 and outputs (plays) the recorded voice signal through the routing portion 86, according to the instructions from the control portion 52.

The scanner portion 62 reads an image from a sheet set at a read position 92 (see FIG. 1) according to the instructions from the control portion 52 and generates image data of the image. This image data is encoded by the encoder 67 and modulated by the modem 64 to be turned into an image signal which can be transmitted to a telephone network 100. The image signal is outputted to the routing portion 86.

The print portion 66 prints an image, obtained from image data, on a sheet set at a feed position 94 (see FIG. 1) according to the instructions from the control portion 52. An example of the image data used for this image printing, for example, is the image data generated by demodulating, by the modem 64, and decoding, by the decoder 68, an image signal inputted from the telephone network 100 through the routing portion 86 and the NCU 84.

The voice input/output portion 70 comprises a speaker 72, a microphone 74, and a drive circuit 76 that activates the speaker 72 and microphone 74. The voice input/output portion 70 outputs voices based on various voice signals from the speaker 72. A hands-free call is enabled by using the speaker 72 and the microphone 74 as transmitters/receivers. The microphone 74 of the voice input/output portion 70 is provided on the reverse side of a hole 28 on the operation panel 20 (see FIG. 1). Voices are inputted through the hole 28.

The radio communication portion 82 transmits/receives various signals including a voice signal to and from the radio communication portion 45 of the slave terminal 40 by radio communication.

The NCU 84 receives and outputs various signals from and to the telephone network 100. The telephone network 100 may be interpreted as PSTN (Public Switched Telephone Networks) or IP networks.

When an off-hook operation for starting a call is performed by a user using one of the handset 10, voice input/output portion 70 and slave terminal 40 (hereafter referred to as transmitters/receivers), the routing portion 86 sets the corresponding transmitter/receiver as a destination of a voice signal inputted from the NCU 84 and a source of a voice signal outputted to the NCU 84, according to the instructions from the control portion 52. Particularly, when the handset 10 is picked up from the main body of the complex apparatus 1, the destination and source of a voice signal is set to the handset 10. When the speaker phone button 24 on the operation panel 20 is depressed, the destination and source of a voice signal is set to the voice input/output portion 70. When the extension button 44b composing the operation panel 44 of the slave terminal 40 is depressed, the destination and source of a voice signal is set to the slave terminal 40 (i.e. radio communication portion 82). In this manner, a path between the NCU 84 and the transmitter/receiver is opened to transmit a voice signal.

When an on-hook operation for ending a call is performed by a user using one of the transmitters/receivers, the routing portion 86 cancels the above destination and source settings according to the instructions from the control portion 52. The on-hook operation here corresponds to an operation of: putting back the handset 10 onto the main body of the complex apparatus 1; depressing the speaker phone button 24 of the operation panel 20 once again; or depressing the off button 44c composing the operation panel 44 of the slave terminal 40. As a result, the path between the NCU 84 and the transmitter/receiver is closed.

(Call Process in the Complex Apparatus 1)

A call process executed by the control portion 52 of the complex apparatus 1 is explained hereafter, referring to FIG. 3. The call process is started when the off-hook operation is performed. If the off-hook operation is performed for receiving an incoming call through the telephone network 100, a call with the caller is started. If the off-hook operation is performed to make a call to someone and when the phone on the other end is answered, the call with the responder is started.

Firstly, it is determined whether the on-hook operation is performed (S110).

If it is determined in step S110 that the on-hook operation is performed (S110: YES), the call process is ended.

On the other hand, if it is determined that the on-hook operation is not performed (S110: NO), it is then determined whether an operation for starting recordation of a call is performed (S120). The "operation for starting recordation of a call" corresponds to: (i) depression of the play/record button 26 on the operation panel 20 if the call process is started with the off-hook operation by means of the handset 10 or voice input/output portion 70, and (ii) depression of the record button 44d on the operation panel 44 of the slave terminal 40 if the call process is started with the off-hook operation by means of the slave terminal 40.

If it is determined that the operation for starting recordation of a call is not performed in step S120 (S120: NO), the process returns to step S110. If it is determined that the operation for starting recordation of a call (S120: YES), the recordation of a call is started (S130). In this step, while maintaining a path between the NCU 84 and the transmitter/receiver for transmission of a voice signal, the routing portion 86 sets the record/play portion 54 as a destination of a voice signal inputted from the NCU 84 and sets the record/play portion 54 as a destination of a voice signal inputted from the transmitter/receiver. In this manner, voice signals, generated based on respective voices of the user and the person on the other end (caller or responder), are inputted to the record/play portion 54. The record/play portion 54 starts recording the voice signals inputted from the NCU 84 and the transmitter/receiver as call data. The call data grows in size (amount) along with an increase in the recording time, until the recordation of a call is ended in the following step (S150, S310).

Next, it is determined whether the on-hook operation is performed (S140).

If it is determined in step S140 that the on-hook operation is performed (S140: YES), the recordation of a call started in step S130 is ended (S150). The call process is also ended. Call data generated in the present call process is given a serial number in order of the generation and stored in the record/play portion 54 with the serial number data. In step S150, firstly, the record/play portion 54 stops recording the voice signals inputted from the NCU 84 and the transmitter/receiver. Then, the serial number data representing a serial number of the call data is associated with the call data generated until step S150 is completed. The routing portion 86 cancels settings for the paths between the NCU 84 and the transmitter/receiver, between the NCU 84 and the record/play portion 54, and between the transmitter/receiver and the record/play portion 54. In this manner, the call between the user and the person on the other end is ended. The voice signals based on voices of both the user and the person on the other end are no longer inputted to the record/play portion 54.

On the other hand, if it is determined in step S140 that the on-hook operation is not performed (S140: NO), it is further determined whether an operation for ending recordation of a call is performed (S160). The "operation for ending recordation of a call" corresponds to: (i) depression of the play/record button 26 on the operation panel 20 once again if the call process is started with the off-hook operation by means of depression of the voice record button 26 in step S130, and (ii) depression of the record button 44d on the operation panel 44 of the slave terminal 40 once more if the call process is started with the depression of the record button 44d on the operation panel 44 of the slave terminal 40.

If it is determined in step S160 that the operation for ending recordation of a call is not performed (S160: NO), it is determined whether a no-service state is detected (S170). The "no-service" state can be detected only when the present call process is started by way of the off-book operation of the slave terminal 40. In the "no-service state", the radio communication portion 82 in the main body of the complex apparatus 1 is unable (or likely to become unable) to communicate with the slave terminal 40 by radio. The control portion 52 monitors a reception level of radiowaves received from the slave terminal 40 via the radio communication portion 82. In this step S170, when the reception level of radiowaves received from the slave terminal 40 is lower (or likely to become lower) than the level required for continuing the radio communication, it is determined that the "no-service state" is detected. The "no-service state" is detected, for example, when the slave terminal 40 is too far from the main body of the complex apparatus 1 and the radio communication portion 82 in the main body of the complex apparatus 1 is unable to receive radiowaves, with a sufficient reception level, transmitted from the radio communication portion 45 in the slave terminal 40. This means that the slave terminal 40 is in a no-service area. The "no-service state" is detected as well, when the power of the battery (not shown) of the slave terminal 40 is lowered, resulting in that the slave terminal 40 is unable to transmit radiowaves with a sufficient signal level.

If it is determined in step S170 that the no-service state is not detected (S170: NO), the process returns to step S140.

On the other hand, if it is determined that the no-service state is detected (S170: YES), the recordation of a call started in step S130 is suspended (S180). In this step, the record/play portion 54 discontinues recording the voice signals inputted from the NCU 84 and the transmitter/receiver.

Next, a timer is started (S190).

Figure 4:
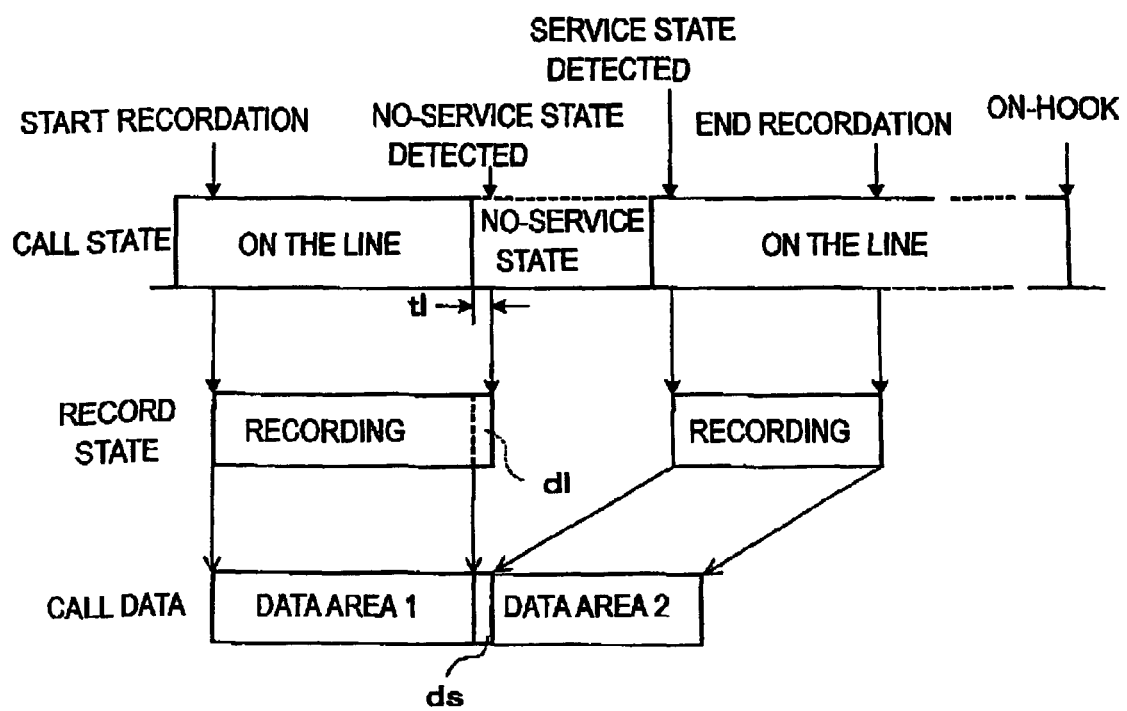
FIG. 4 is a diagram showing call data recorded by a record/play portion.

The call data is modified (S200). There is a time lag from when the slave terminal 40 enters into a no-service area until the no-service state is detected and the recordation of a call is suspended by the control portion 52 in step S180, owing to detection accuracy and detection timing by the control portion 52 and arrival time of the instructions to the record/play portion 54. As a result, a voiceless area may be created in the call data. In this step S200, a data area d1, corresponding to the area recorded during a period t1, that is, from the actual entry of the slave terminal 40 into a no-service area till the detection of the no-service state and suspension of the recordation, is removed from the call data after step S180 is ended (see FIG. 4). In this manner, the call data is adjusted (modified) to be without an area where no voice is recorded.

Then, interruption data ds, which indicates that the recordation of the call is interrupted, is added to the call data (S210). The interruption data ds is added only to show that the recordation of a call is interrupted and to specify the area where there is an interruption. The interruption data de is sufficiently smaller in size than data which records voice signals (see FIG. 4).

It is determined whether the on-hook operation is performed (S220).

If it is determined in step S220 that the on-hook operation is performed (S220: YES), the process moves to step S150.

On the other hand, if it is determined in step S220 that the on-hook operation is not performed (S220: NO), it is determined whether the no-service state continues (S230). In this step, it is determined whether the no-service state is detected as in step S170.

If it is determined in step S230 that the no-service state no longer continues (S230: NO), the recordation of a call which has been interrupted in step S180 is resumed (S240). In this step, the record/start portion 64 resumes recording the voice signals inputted from the NCU 84 and the transmitter/receiver. The "no-service state" discontinues, for example, when the slave terminal 40 comes close to the main body of the complex apparatus 1 and the main body of the complex apparatus 1 becomes able to receive radiowaves from the slave terminal 40 with a sufficient reception level. This means that the slave terminal 40 is within a range where the radiowaves from the main body can be received. The "no-service state" discontinues as well, when the slave terminal 40 is powered by a battery charger (not shown), resulting in that the slave terminal 40 becomes able to transmit radiowaves with a sufficient signal level.

Next, information on interruption time is added to the interruption data ds which is added in step S210 (S250). In this step, the information on interruption time (i.e. data representing the interruption time), that is, the value shown in the timer, is added to the interruption data ds so that the interruption time can be specified.

The timer started in step S190 is stopped and reset (S260). The process returns to step S140.

On the other hand, if it is determined in step S230 that the no-service state continues (S230: YES), it is further determined whether the operation for ending recordation of a call is performed (S270). This step is identical to step S160.

If it is determined in step S270 that the operation for ending recordation of a call is not performed (S270: NO), it is then determined in step S190 whether the value shown in the timer is more than a predetermined threshold (timed out is detected). In the present embodiment, the threshold is set to one minute.

If it is determined in step S280 that timed out is not detected (S280: NO), the process returns to step S220.

On the other hand, if it is determined in step S280 that timed out is detected (S280: YES), the information on interruption time is added to the interruption data ds which is added in step S210 (S290). In this step, as in step S250, the information on interruption time is added to the interruption data ds so that the value shown in the timer can be specified.

Next, the timer started in step S190 is stopped and reset (S300).

After step S300 or if it is determined in step S160 that the operation for ending recordation of a call is performed (S160: YES), the recordation of a call started in step S130 is ended (S310). In step S310, recording of the voice signals inputted from the NCU 84 and the transmitter/receiver is stopped as in step S150. Then, the aforementioned serial number data is associated with the call data generated till step S310 is completed. Further, the settings for the paths between the NCU 84 and the record/play portion 54 and between the transmitters/receivers and the record/play portion 54 are cancelled. In this manner, the call between the user and the person on the other end is continued, but the voice signals generated from the voices of both the user and the person on the other end are no longer inputted to the record/play portion 54. Then, the process returns to step S110.

After the process returns to step S110, the present call process is ended by execution of the on-hook operation in step S110, S140 or S220.

(Call Replay Process by the Complex Apparatus 1)

Figure 5:
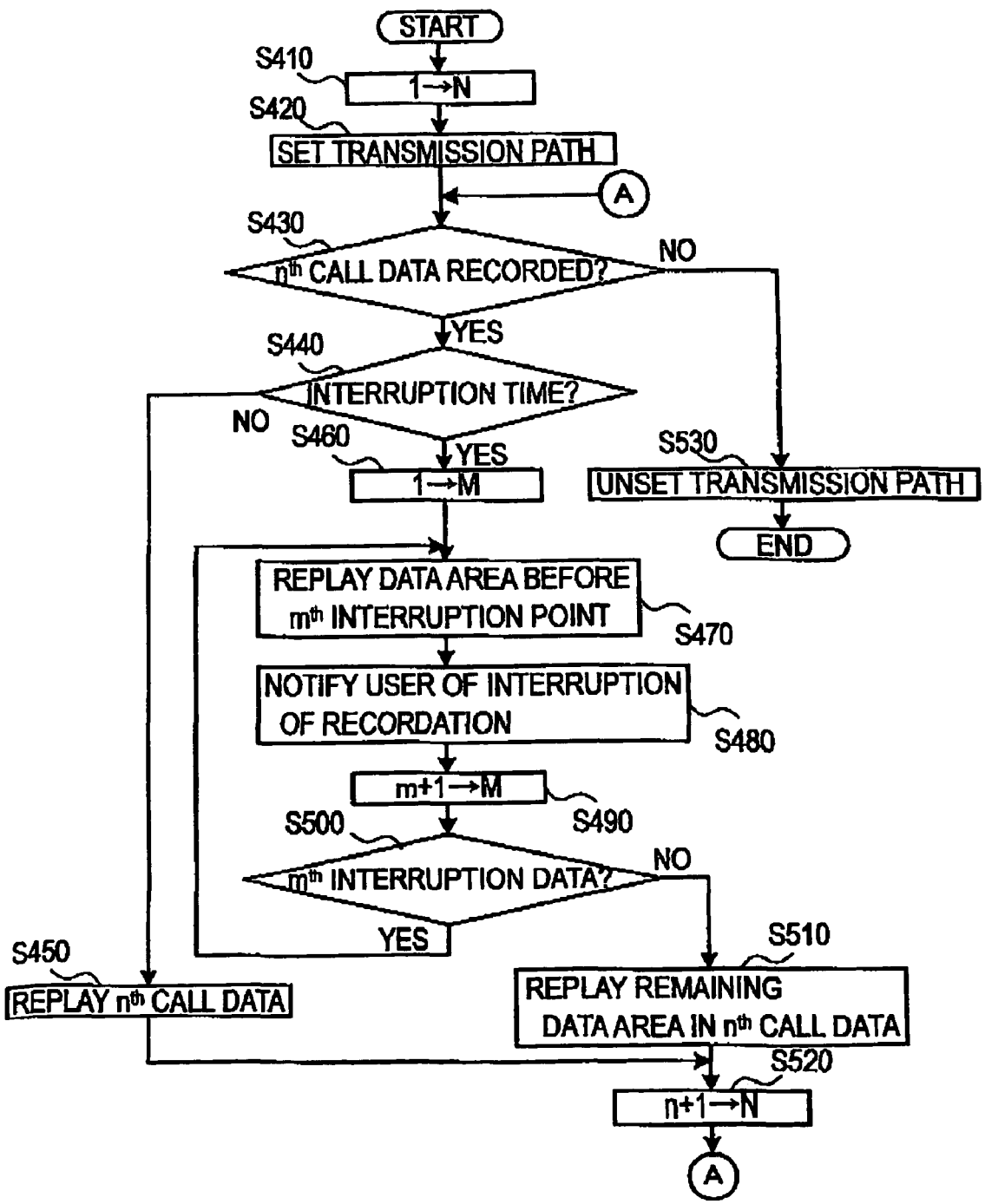

Now, a call replay process executed by the control portion 52 in the complex apparatus 1 is explained by way of FIG. 5. The call replay process is started when the play/record button 26 on the operation panel 20 is depressed in a state that no call is made on the complex apparatus 1.

Firstly, a variable N is initialized (S410). In this step, the variable N is set to "1" (1→N). It should be noted that a letter "n" that appears from now on indicates a value set in the variable N.

The routing portion 86 sets the voice input/output portion 70 as a destination (transmission path) of the voice signals outputted from the record/play portion 54 (S420).

Next, it is determined whether the $n^{th}$ call data is found in the record/play portion 54 (S430). In this step, if call data having a serial number equal to n as the serial number data is recorded, it is determined that the $n^{th}$ call data is found.

In this step S420, if it is determined that the $n^{th}$ call data is found in the record/play portion 54 (S430: YES), it is determined whether the call data has an intermission (S440). In this step, if the $n^{th}$ call data includes the interruption data added in step S210, it is determined that the data has an intermission.

In step S440, if it is determined that the data has no intermission, (S440: NO), the call in the $n^{th}$ call data is replayed (S450). In this step, contents of all the data areas in the $n^{th}$ call data are replayed (outputted) by the record/play portion 54, and outputted as voices from the voice input/output portion 70.

On the other hand, if it is determined in step S440 that the data has an intermission (S440: YES), a variable M is initialized (S460). In this step, the variable M is set to "1" (1→N). It should be noted that a letter "m" that appears from now on indicates a value set in the variable M.

Next, the data area, in the $n^{th}$ call data, before the $m^{th}$ intermission point is replayed (S470). In this step, the call data is regarded as data composed of a plurality of data areas separated by interruption data de (see FIG. 4). Only the data area located just before the $m^{th}$ interruption data from the head of the call data is replayed (outputted). In this manner, the contents in the $m^{th}$ data area of the $n^{th}$ call data are outputted as voices from the voice input/output portion 70.

After the contents in the $m^{th}$ data area are outputted in step S470, the user is notified that the recordation of a call has been interrupted (S480). Several messages are recorded beforehand in the record/play portion 54. In this step, a message that informs the user that the recordation has an intermission is replayed by the record/play portion 54 and outputted as voices from the voice input/output portion 70. A voice signal, representing the interruption time which can be specified by the $m^{th}$ interruption data, is inserted to the message before the replay. In the record/play portion 54, a plurality of voices, representing numbers and units (hour, minute, second), are recorded. These voices are combined to generate a voice signal representing the interruption time.

Next, the variable M is incremented by "1" (m+1→M) (S490).

It is determined whether the $m^{th}$ interruption point exists in the $n^{th}$ call data (S500). In this step, if the $m^{th}$ interruption data ds is found in the $n^{th}$ call data, it is determined that the $m^{th}$ interruption point exists.

If it is determined whether the $m^{th}$ interruption point exists (S500: YES), the process returns to step S470 after the notification (message replay) in step S480.

On the other hand, if it is determined in step S500 that the $m^{th}$ interruption point does not exist (S500: NO), the contents in the remaining data area in the $n^{th}$ call data are replayed (S510). In this step, the record/play portion 54 replays (outputs) the contents of the data area which follows the $(m-1)^{th}$ interruption data. In this manner, the contents in the remaining data area in the $n^{th}$ call data are outputted as voices from the voice input/output portion 70.

When the replay of the contents in step S510 or S450 is completed, the variable N is incremented by "1" (n+1→N) (S520). The process returns to step S430.

Steps S430 to S520 are repeated to replay the contents in the call data recorded by the record/play portion 54 sequentially. When it is determined in step S430 that the $n^{th}$ call data is not found in the record/play portion 54 (S430: NO), the routing portion 86 cancels the settings of the transmission line between the record/play portion 54 and the voice input/output portion 70 (S530). The present call replay process is ended.

According to the complex apparatus 1, the recordation of a call by the record/play portion 54 can be interrupted while the no-service state is detected. Accordingly, voiceless data is no longer included in the call data. The size (amount) of the call data does not expand in vain.

Also in step S200 in FIG. 3, the area in the call data where no voice is recorded can be removed. Therefore, efficient use of the record area for recording call data is achieved in the record/play portion 54.

In step S480 in FIG. 5, the user can be notified that the recordation of a call has been interrupted due to detection of the no-service state. Specifically in this step, the user can be also notified how long the intermission has lasted.

Second Embodiment

A complex apparatus 2 has essentially the same construction as the complex apparatus 1 in the first embodiment. Therefore, only the difference is described hereafter.

(Call Process by the Complex Apparatus 2)

Figure 6:
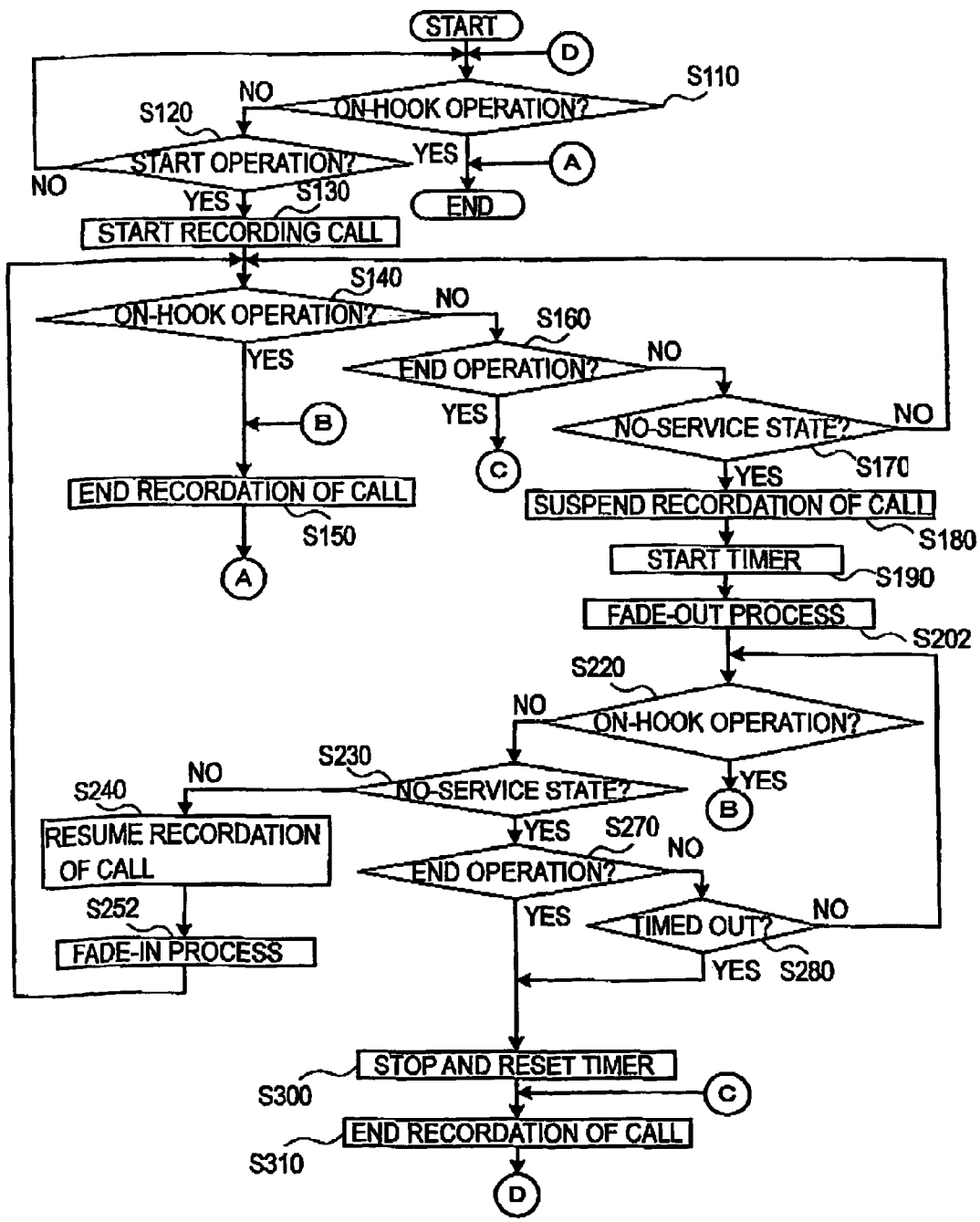
FIG. 6 is a flowchart illustrating a call replay process according to the first embodiment.

A call process executed by the control portion 62 of the complex apparatus 2 is explained referring to FIG. 6. This call process is only different from the call process shown in FIG. 3 in a few steps. Accordingly, merely the difference will be described in detail.

Figure 7:
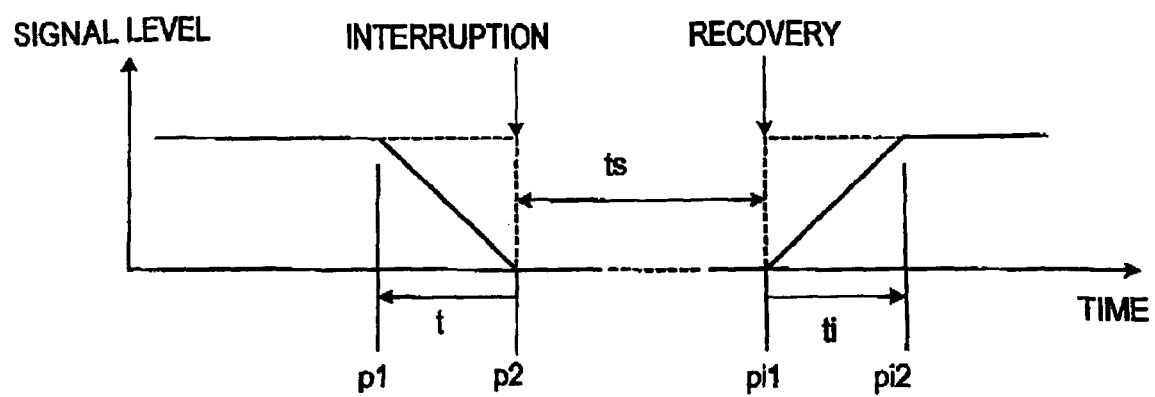
FIG. 7 is a diagram showing call data to which fade-out and fade-in processes are applied.

After the timer started in step S190, the fade-out process is performed (S202). In step S202, as shown in FIG. 7, a signal level (i.e. volume) of the voice signal in the call data between from a point p1, which corresponds to a predetermined time t (1 second in the present embodiment) prior to a point p2 where the recordation of call data is interrupted, to the point p2 is modified to fade out. Then, the process moves to step S220.

Also, after the recordation of a call is resumed in step S240, the fade-in process is performed (S252). In step S252, as shown in FIG. 7, a signal level of the voice signal in the call data between from a point pi1, where the recordation is resumed, to a point pi2 corresponding to a predetermined time ti (1 second in the present embodiment) posterior to the point pi1 is modified to fade in. Then, the process returns to step S140.

In the call process in the present embodiment, steps relating to the interruption data (S210, S250, S290) are not performed.

(Call Replay Process by the Complex Apparatus 2)

The call replay process in the present embodiment is only slightly different from the call replay process shown in FIG. 5. When it is determined in step S430 that the $n^{th}$ call data is found, the process moves to step S450 skipping S440, and S460-S510.

In the above complex apparatus 2, since the fade-out and fade-in processes are performed, the volume of the contents of a call fades out toward the interruption point of the recordation of a call and fades in from the recovery point of the recordation of a call. Therefore, the user can easily recognize that there is an interruption in the recordation of a call.

[Modifications and Variations]

In the above, embodiments of the present invention have been described. However, the present invention should not be limited to the above embodiments and can be implemented in other various manners.

For instance, the phone terminal of the present invention is described as a complex apparatus in the above embodiments. However, apparatus other than a complex apparatus may serve as the phone terminal, as long as the apparatus have a function of recording/playing a call. Particularly, a known cell phone can be also used. In this case, whether the no-service state is detected in FIG. 3 or 6 can depend on whether the cell phone can communicate with the base station.

Also in the above embodiments, the processes shown in the respective flowcharts are executed by the control portion 62 in the complex apparatus 1, 2. However, part or all of these processes can be processed by another computer system which is connected with the complex apparatus 1, 2 or the slave terminal 40 via a wired/radio signal transmission path.

In the above, the processes shown in the respective flowcharts are executed according to the instructions stored in a memory of the control portion 52. However, if the complex apparatus 1, 2 is configured so as to be capable of exchanging data with recording media such as a FD and a memory card, the complex apparatus may execute the processes in accordance with instructions read from such recording media.

In step S120 in FIG. 3, the recordation of a call is initiated when the "operation for starting recordation of a call" is performed. The "operation for starting recordation of a call" may include start conditions other than those described in the embodiment. For example, the complex apparatus may be configured in such a way that the above start conditions correspond to a specific operation made to the operation panel 20 (or operation panel 44 of the slave terminal 40). When the operation set as the start conditions is performed in step S120, the recordation of a call can be started.

Figure 8:
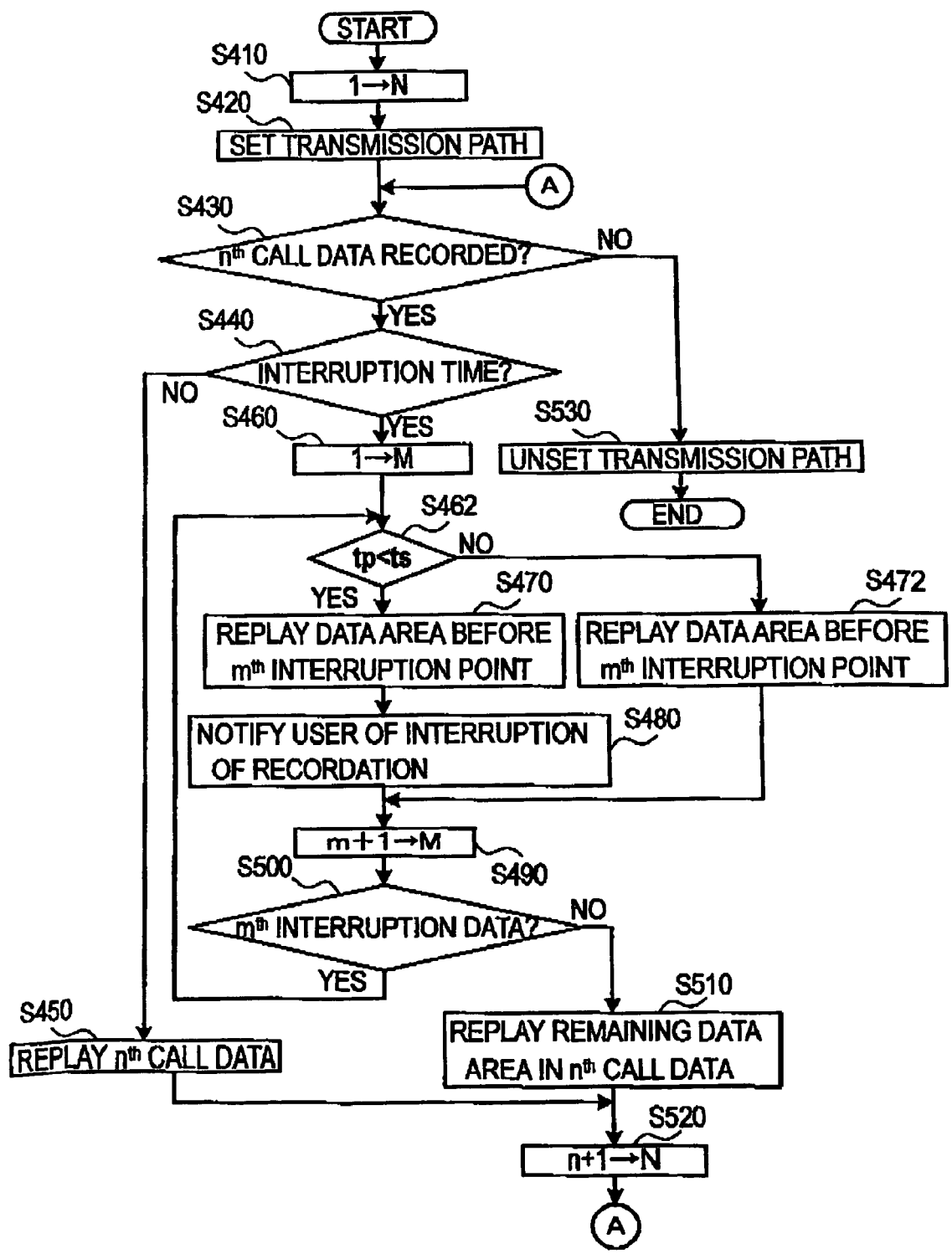
FIG. 8 is a flowchart illustrating a call replay process according to another embodiment.

Also in step S120 in FIG. 8, it is shown that the "operation for starting recordation of a call" corresponds to: (i) depression of the play/record button 26 if the call process is started with the off-hook operation by means of the handset 10, and (ii) depression of the record button 44d if the call process is started with the off-hook operation by means of the slave terminal 40. However, the recordation of a call may begin when the play/record button 26 on the operation panel 20 is depressed during a call by means of the slave terminal 40.

Similarly, recordation of a call comes to end when the "operation for ending recordation of a call" is performed in step S160, S270 in FIG. 3, when the off-hook operation is performed in step S140, S220 or when timed out is detected in step S280. However, other end conditions can be adopted as well. For example, the complex apparatus may be configured in such a way that the above end conditions correspond to a specific operation made to the operation panel 20 (or operation panel 44 of the slave terminal 40). When the operation set as the end conditions is performed in step S120, the recordation of a call is ended.

In step S170, S230, whether the no-service state is detected is determined based on the reception level of radiowaves transmitted from the slave terminal 40 to the main body of the complex apparatus 1. However, the basis for determination is not limited to the above reception level. For instance, a reception level of radiowaves transmitted from the main body of the complex apparatus 1 to the slave terminal 40 may be monitored. In this case, the slave terminal 40 is configured to transmit a warning signal when the reception level becomes lower than a predetermined level. In step S170, S230, it is determined that the no-service state is detected when the warning signal is received from the slave terminal 40.

It is preferable that the user is notified that the recordation of a call has been suspended due to timed out when timed out is detected in step S280 in FIG. 3, before the process moves on to step S290. Particularly, a transmission path connecting the record/play portion 54 and the voice input/output portion 70 is created by the routing portion 86, for example. A message stating that the recordation has been suspended due to timed out, among other messages recorded in the record/play portion 54 in advance, is replayed and outputted from the voice input/output portion 70. Or, a transmission path between the record/play portion 54 and a transmitter/receiver is created by the routing portion 86, so that the message is replayed and outputted from the transmitter/receiver. Or, the message may be displayed on the display panel 30.

In the above embodiments, the user is notified of the interruption of recordation of a call by way of a message in step S480 in FIG. 5. However, this notification can be made by means of a sound having a specific frequency or a hold sound for use in putting a call on hold, which is played for a certain period. The "certain period" in this context can be interpreted as a period during which the sound is repeated for predetermined times, for example.

Also in step S480, replay of the call data may be suspended for the duration of the interruption (interruption time specified by the interruption data ds), without any output. In this manner, the user can be notified that the recordation of a call is interrupted by being kept waiting. In this preference, the call data after the recovery of recordation is replayed when the interruption time has passed. As a result, the call can be reproduced in a conventional manner with the call data smaller in size than before.

Additional step S462, as shown in FIG. 8, may be added after step S460. That is, if the interruption time ts between the interruption point p2 and the recovery point pi1 is more than a predetermined threshold tp (tp<ts) (S462: YES), the process moves to step S470. If the interruption time ts is not more than the predetermined threshold tp (ts≦tp) (S462: NO), a data area before the $m^{th}$ interruption point is replayed as in step S470. The process then moves to step S490. In this preference, the user is not notified that the recordation of a call has been interrupted if the interruption time ts is equal to or less than the predetermined threshold tp. In this case, voices before the interruption of recordation are outputted at first, and then, voices after the recovery of recordation are outputted from the voice input/output unit 70. If the threshold tp is set to be small enough to be negligible, the recording of the call can be taken as natural even without notification.

In the above embodiments, the recordation of a call is interrupted when the no-service state is detected. However, other obstructive conditions can be also set.

What is claimed is:

1. A phone terminal comprising:
   a record unit that records various data;
   a voice output unit that outputs various voices;
   a record instruction unit that instructs the record unit to record voices in a call as call data from when predetermined start conditions are fulfilled until predetermined end conditions are fulfilled;
   a play instruction unit that instructs the voice output unit to:
      output the call data recorded by the record unit as voices, in response to a user operation, and
      instruct the voice output unit to insert notification to inform a user that obstructive conditions are detected between an output of the call data recorded before interruption of a recording and an output of the call data recorded after the recording is resumed;
   a record interruption unit that suspends the recording of the call data during a period in which the obstructive conditions that prevent the call are detected; and
   a first interruption timing unit that times interruption time from when the recording of call data is interrupted until the recording is resumed, wherein:
   the record instruction unit instructs the record unit to record the call data in association with interruption data representing the interruption time timed by the first interruption timing unit,
   when obstructive conditions are not detected, the play instruction unit instructs the voice output unit to output the recorded call data and, when obstructive conditions are detected, the play instruction unit instructs the voice output unit to:
      output the call data recorded before interruption of the recording;
      generate a message that the obstructive conditions are detected and to output the message as the notification; and
      output the call data recorded after the recording is resumed, and
      wherein the call data that was recorded before and after the obstructive conditions is detected within a single call.

2. The phone terminal as set forth in claim 1, further comprising:
   a slave terminal that transmits and receives various data including voices to and from the phone terminal by radio communication; and
   a no-service detection unit that detects a no-service state in which the phone terminal is unable to communicate with the slave terminal by radio communication, wherein:
   the record interruption unit determines that the obstructive conditions are detected when the no-service state is detected and the recording of the call data is suspended.

3. The phone terminal as set forth in claim 1, further comprising:
   an area deletion unit that removes a data area of the call data recorded from when the obstructive conditions are satisfied until the recording is actually suspended.

4. The phone terminal as set forth in claim 1, further comprising:
   a fade-out unit that fades out voices in the call data over a range recorded from a predetermined time before a point of interruption until the point of interruption.

5. The phone terminal as set forth in claim 1, further comprising:
   a fade-in unit that fades in voices in the call data over a range recorded from a point of recovery of the recording after interruption of the recording until a predetermined time after the point of recovery.

6. The phone terminal as set forth in claim 1, wherein:
   the play instruction unit instructs the voice output unit to output a voice signal having a specific frequency as the notification for a predetermined period.

7. The phone terminal as set forth in claim 1, wherein:
   the play instruction unit instructs the voice output unit to insert a pause for a predetermined time between the output recorded before the record interruption unit instructs the interruption of the recording and the output recorded after the recording is resumed.

8. The phone terminal as set forth in claim 1, further comprising:
- a second interruption timing unit that times interruption time from when the recording of call data is interrupted until the recording is resumed, wherein:
- the record instruction unit instructs the record unit to record the call data in association with interruption data representing the interruption time timed by the second interruption timing unit, and
- the play instruction unit instructs the voice output unit to insert a pause for the interruption time, indicated by the corresponding interruption data of the call data, between the output recorded before the recording is interrupted and the output recorded after the recording is resumed.

9. The phone terminal as set forth in claim 8, further comprising:
- a third interruption timing unit that times interruption time from when the recording of call data is interrupted until the recording is resumed, wherein:
- the record instruction unit instructs the record unit to record the call data in association with interruption data representing the interruption time timed by the third interruption timing unit, and
- the play instruction unit instructs the voice output unit not to insert the notification if the interruption time indicated by the corresponding interruption data of the call data is within a predetermined time frame.

10. A tangible non-transitory computer readable memory that stores a record/play computer-executable program, the program comprising:
- instructions to record voices in a call as call data from when predetermined start conditions are fulfilled until predetermined end conditions are fulfilled;
- instructions to output the call data recorded by the record unit as voices, in response to a user operation, and to inform a user that obstructive conditions are detected between:
  - an output as voices of a data area of the call data recorded before interruption of the recording; and
  - the output as voices of a data area of the call recorded after recording is resumed,
- instructions to suspend the recording of call data during a period in which the obstructive conditions that prevent the call are detected; and
- instructions to time an interruption time from when the recording of call data is interrupted until the recording is resumed, wherein
- instructions to record the call data in association with interruption data representing the timed interruption time,
- wherein when obstructive conditions are not detected, the instructions to output the call data output the recorded call data and, when obstructive conditions are detected, the instructions to output the call data:
  - output the call data recorded before interruption of the recording;
  - generate a message that the obstructive conditions are detected and to output the message; and
  - output the call data recorded after the recording is resumed, and
- wherein the call data that was recorded before and after the obstructive conditions is detected within a single call.

* * * * *